US010173689B1

(12) United States Patent
Bullock et al.

(10) Patent No.: US 10,173,689 B1
(45) Date of Patent: Jan. 8, 2019

(54) RECREATIONAL VEHICLE AND INTEGRATED BODY CONTROL AND WEIGHT SENSING SYSTEM

(71) Applicant: Thor Tech, Inc., Elkhart, IN (US)

(72) Inventors: Mark Bullock, Elkhart, IN (US); Jeffrey Snyder, White Pigeon, MI (US)

(73) Assignee: Thor Tech, Inc., Elkhart, IN (US)

( * ) Notice: Subject to any disclaimer, the term of this patent is extended or adjusted under 35 U.S.C. 154(b) by 0 days.

(21) Appl. No.: 15/875,037

(22) Filed: Jan. 19, 2018

(51) Int. Cl.
*B60W 40/13* (2012.01)
*G01G 19/08* (2006.01)
*B60K 35/00* (2006.01)

(52) U.S. Cl.
CPC .............. *B60W 40/13* (2013.01); *B60K 35/00* (2013.01); *G01G 19/086* (2013.01); *B60K 2350/1028* (2013.01); *B60K 2350/1076* (2013.01); *B60W 2530/10* (2013.01)

(58) Field of Classification Search
CPC ........... G06K 9/00832; G06K 9/00255; G06Q 50/30; H04L 67/12; B60K 35/00; G06F 3/016
See application file for complete search history.

(56) References Cited

U.S. PATENT DOCUMENTS

| | | | |
|---|---|---|---|
| 3,650,340 A | 3/1972 | Bradley | |
| 3,780,817 A | 12/1973 | Videon | |
| 3,878,908 A | 4/1975 | Andersson et al. | |
| 4,666,003 A | 5/1987 | Reichow | |
| 4,673,047 A | 6/1987 | Harbour | |
| 4,852,674 A | 8/1989 | Gudat | |
| 5,076,375 A | 12/1991 | Dillon et al. | |
| 5,230,392 A | 7/1993 | Tremblay | |
| 5,327,791 A | 7/1994 | Walker | |
| 5,391,843 A | 2/1995 | Sato et al. | |
| 5,410,109 A | 4/1995 | Tarter et al. | |

(Continued)

OTHER PUBLICATIONS

"Smart Scale—Wireless Onboard Scale for Mechanical Suspension" www.truckweight.com Accessed: 2016.

(Continued)

*Primary Examiner* — Elias Desta
(74) *Attorney, Agent, or Firm* — Dinsmore & Shohl, LLP

(57) ABSTRACT

In accordance with one embodiment of the present disclosure, a recreational vehicle is provided comprising a vehicle body supported by at least one axle assembly, a plurality of operational components, at least one weight-sensing component, a body control module in communication with the operational components, a weight processing module in communication with the weight-sensing component, and a user interface. The user interface is in communication with the body control module and the weight processing module and comprises user prompts for (i) associating particular operational components with the recreational vehicle and (ii) associating a particular weight-related parameter with the recreational vehicle. The weight processing module, the weight-sensing component, and the user interface are structured to generate an indication of vehicle weight at the user interface. The indication of vehicle weight is at least partially dependent upon the particular weight-related parameter associated with the recreational vehicle at the user interface. Additional embodiments are disclosed and claimed.

30 Claims, 5 Drawing Sheets

(56) References Cited

U.S. PATENT DOCUMENTS

| | | | |
|---|---|---|---|
| 5,780,782 | A | 7/1998 | O'Dea |
| 5,811,738 | A | 9/1998 | Boyovich et al. |
| 5,880,409 | A | 3/1999 | Hartman |
| 6,025,563 | A | 2/2000 | Lesesky et al. |
| 6,118,083 | A | 9/2000 | Boyovich et al. |
| 6,449,582 | B1 * | 9/2002 | Chaklader ........... B60C 23/0408 702/101 |
| 6,590,168 | B2 | 7/2003 | Kawaguchi et al. |
| 6,855,894 | B1 | 2/2005 | Van Seumeren |
| 7,572,988 | B1 | 8/2009 | Morton et al. |
| 8,570,183 | B2 * | 10/2013 | Corrado ................. G01B 21/26 303/22.6 |
| 2007/0181350 | A1 | 8/2007 | Kranz et al. |
| 2008/0262774 | A1 | 10/2008 | Fasig et al. |
| 2014/0000969 | A1 * | 1/2014 | Carruthers ............. G01G 19/12 177/136 |

OTHER PUBLICATIONS

Fernando et al., "Truck Instrumentation for Dynamic Load Measurement", Published: Dec. 2007, Texas Transportation Institute.
Davis et al., "Suspension testing of 3 heavy vehicles—methodology and preliminary frequency analysis", www.mainroads.qld.gov.au 2008.
49 C.F.R Section 571.3 "Definitions" Oct. 2010.

* cited by examiner

RECREATIONAL VEHICLE AND INTEGRATED BODY CONTROL AND WEIGHT SENSING SYSTEM

BACKGROUND

The present disclosure relates to recreational vehicles and, more particularly, to recreational vehicles where it may be advantageous to monitor the loaded weight of the vehicle. Recreational vehicles encompassed by the present disclosure include trailer-type recreational vehicles, which include fifth wheel trailers and other types of towable campers, toy haulers, etc. Recreational vehicles encompassed by the present disclosure also include motored recreational vehicles, like motor homes and other vehicles with their own motor and drive train.

BRIEF SUMMARY

According to the subject matter of the present disclosure, recreational vehicles are provided with a body control module and a weight processing module that are integrated with a user interface to provide a convenient and effective on-board weighing system for the vehicle. Stand-alone body control and weight-sensing systems for recreational vehicles are also contemplated.

The user interface and on-board weighing system can be accessed by technicians for set-up, configuration, and maintenance purposes, or by the operator of the recreational vehicle (RV), and is designed such that the on-board weighing system can be readily configurable for a variety of different trailers and operating conditions. Although an operator of the RV may be granted full access rights to the functionality of the user interface, it is more likely that operator access rights will be limited in some respects, but will be expansive enough to ensure optimum enjoyment of the RV experience or to otherwise enhance the functionality of the RV. In any case, it is noted that the aforementioned technicians and operators are collectively referred to herein as "users" of the disclosed RV and its various systems and components.

In accordance with one embodiment of the present disclosure, a recreational vehicle is provided comprising a vehicle body supported by at least one axle assembly, a plurality of operational components, at least one weight-sensing component, a body control module in communication with the operational components, a weight processing module in communication with the weight-sensing component, and a user interface. The user interface is in communication with the body control module and the weight processing module and comprises user prompts for (i) associating particular operational components with the recreational vehicle and (ii) associating a particular weight-related parameter with the recreational vehicle. The weight processing module, the weight-sensing component, and the user interface are structured to generate an indication of vehicle weight at the user interface. The indication of vehicle weight is at least partially dependent upon the particular weight-related parameter associated with the recreational vehicle at the user interface.

In accordance with another embodiment of the present disclosure, an integrated body control and weight-sensing system for a recreational vehicle is provided. The system comprises at least one weight-sensing component configured to provide a signal representing the weight of the recreational vehicle, a body control module in communication with the operational components, a weight processing module in communication with the weight-sensing component, and a user interface. The user interface is in communication with the body control module and the weight processing module and comprises user prompts for (i) associating particular operational components with the recreational vehicle and (ii) associating a particular weight-related parameter with the recreational vehicle. The weight processing module, the weight-sensing component, and the user interface are structured to generate an indication of vehicle weight at the user interface. The indication of vehicle weight is at least partially dependent upon the particular weight-related parameter associated with the recreational vehicle at the user interface.

In accordance with yet another embodiment of the present disclosure, a recreational vehicle is provided comprising a vehicle body supported by at least one axle assembly, a plurality of operational components, at least one weight-sensing component, a body control module in communication with the operational components, a weight processing module in communication with the weight-sensing component, and a user interface. The user interface comprises user prompts for associating a particular weight-related parameter representing a configuration metric of the weight-sensing component with the recreational vehicle. The weight processing module is configured such that an indication of vehicle weight generated by the weight processing module, the weight-sensing component, and the user interface is at least partially dependent upon (i) the particular weight-related parameter associated with the recreational vehicle at the user interface and (ii) one or more of the particular operational components associated with the recreational vehicle at the user interface. The weight processing module, the weight-sensing components, and the user interface are further structured to (i) regenerate the indication of vehicle weight at the user interface if there is a change to the weight-related parameter associated with the recreational vehicle at the user interface and (ii) regenerate the indication of vehicle weight at the user interface if there is a change to a particular operational component upon which the indication of vehicle weight is dependent at the user interface. Additional embodiments are disclosed and claimed.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
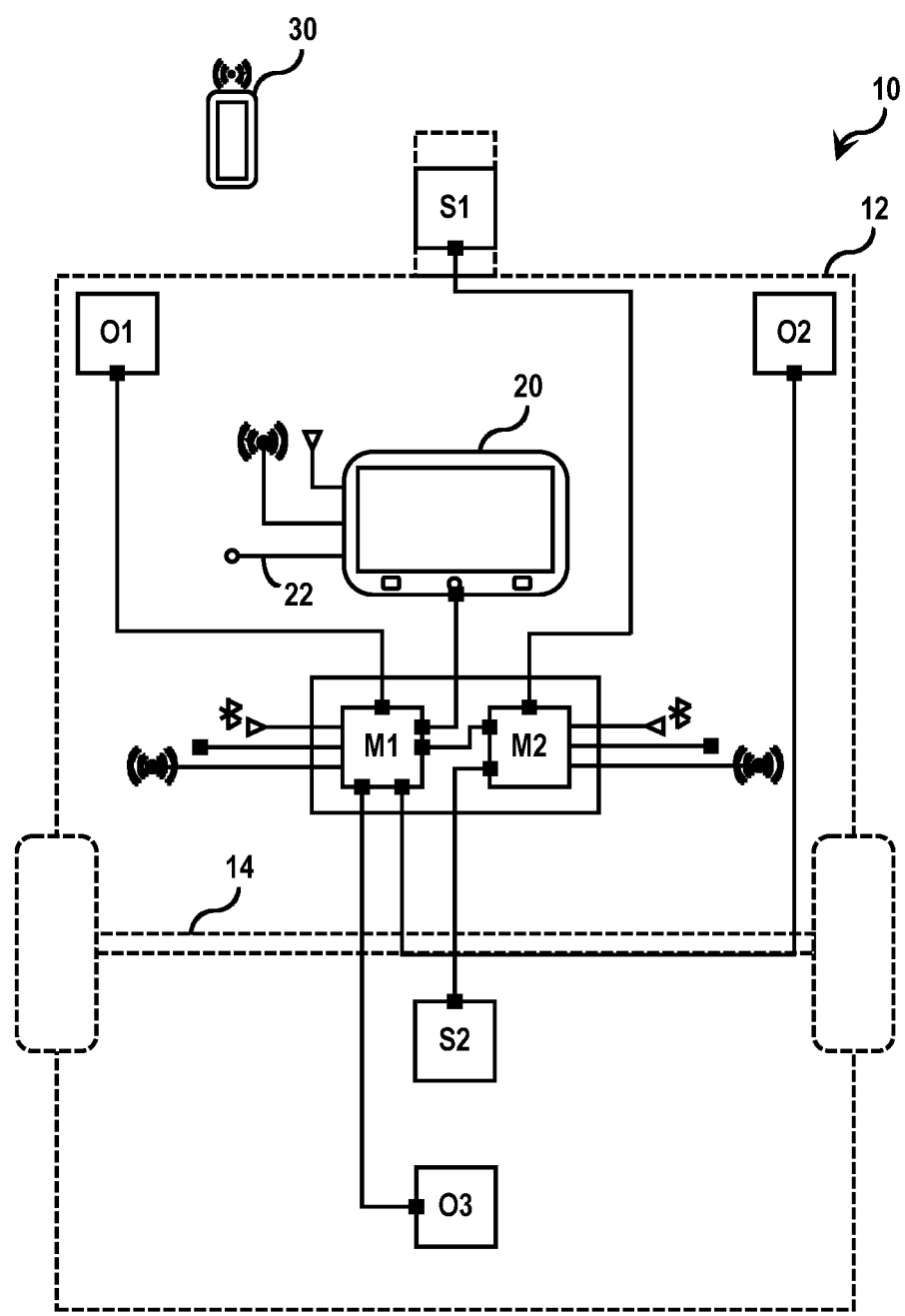
FIG. 1 is a schematic illustration of a recreational vehicle according to the present disclosure, presented in the non-limiting context of a single-axle, trailer-type, recreational vehicle.

FIG. 1 illustrates a recreational vehicle (RV) 10 according to the present disclosure, presented in the non-limiting context of a single-axle, trailer-type RV. The RV 10 comprises a vehicle body 12 supported by at least one axle assembly 14, a plurality of operational components O1, O2, O3 and weight-sensing components S1, S2, a body control module M1, a weight processing module M2, and a user interface 20. As is illustrated in FIG. 1, the body control module M1 is in communication with the operational components O1, O2, O3. The weight processing module M2 is in communication with the weight-sensing components S1, S2. Both the body control module M1 and the weight processing module M2 are either directly or indirectly in communication with the user interface 20. For example, in the embodiment illustrated in FIG. 1, the body control module M1 is in direct communication with the user interface 20, while the weight processing module M2 communicates with the user interface 20 indirectly via the body control module M1. In other embodiments encompassed by the present disclosure, the weight processing module M2 communicates directly with the user interface 20.

The user interface 20 comprises user prompts for associating particular operational components O1, O2, O3 and particular weight-related parameters W1, W2, W3 with the recreational vehicle 10. The weight processing module M2, the weight-sensing components S1, S2, and the user interface 20 are structured to generate an indication of vehicle weight at the user interface 20. This indication of vehicle weight is primarily dependent upon the particular weight-related parameters W1, W2, . . . Wn associated with the recreational vehicle 10 at the user interface 20. For the purposes of the present disclosure, it is noted that weight-related parameters W1, W2, . . . Wn are factors or variables that affect the manner in which a sensed weight is calculated, reported, or otherwise used to provide an operator of the RV with useful information regarding the weight of the vehicle. Weight-related parameters W1, W2, . . . Wn may include configuration metrics associated with the particular type of weight-sensing components S1, S2, . . . Sn in use with the recreational vehicle. More specifically, these configuration metrics may be used to establish the type, number, or operating parameters of the particular weight-sensing components S1, S2, . . . Sn in use so that the weight-sensing module M2 may utilize the signals therefrom to calculate vehicle weight in an accurate and reliable manner. For example, and not by way of limitation, the weight-related parameters W1, W2, . . . Wn may include the load-bearing axle count of the RV, the type or number of axles, tires or wheels of the RV, hitch assembly descriptors, suspension component descriptors, body component descriptors, or any other factor that would affect the manner in which the weight processing module M2, the weight-sensing components S1, S2, . . . Sn, and the user interface generate the indication of vehicle weight at the user interface.

The aforementioned indication of vehicle weight may be further dependent upon one or more of the particular operational components O1, O2, O3 associated with the recreational vehicle 10 at the user interface 20. This feature would be particularly beneficial if the presence or absence of a particular operational component would affect the manner in which vehicle weight is calculated or the manner in which vehicle weight is indicated at the user interface.

Figure 2:
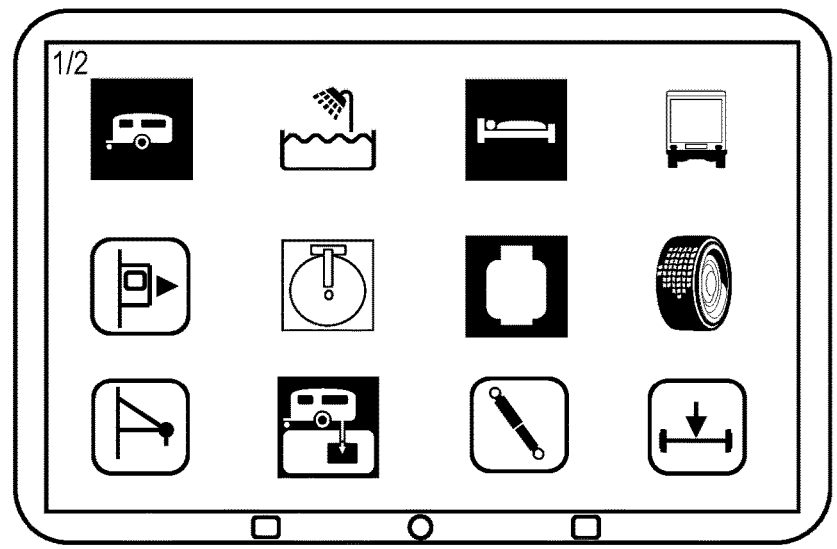
FIG. 2 is a schematic illustration of a user interface page including user prompts for associating particular operational components with a recreational vehicle, presented in the non-limiting context of a tablet-type computing device with specific, non-limiting, touch screen icons and graphics.

FIG. 2 is a schematic illustration of a first user interface page including user prompts, illustrated as touch screen icons, for associating particular operational components O1, O2, . . . On with a recreational vehicle. For the purposes of the present disclosure, it is noted that an "operational component" is a component of the vehicle that operates to change, control, or monitor a condition of the recreational vehicle. For example, and not by way of limitation, operational components O1, O2, . . . On can include (i) motorized components like electric or hydraulic slide rooms, awnings, stabilizer jacks, hydraulic landing gear, electric hitches, etc., or (ii) safety-related components like travel lockouts (see U.S. Pat. No. 9,679,735), door alarms, and smoke, propane, and carbon monoxide detectors. Other common operational components O1, O2, . . . On include, but are not limited to, lighting system components, HVAC components, appliances, generators, latch controls, tank heaters, locks, and subsystem monitors, like battery or tank level monitors. The user interface may be conveniently positioned inside of the recreational vehicle.

Referring again to FIG. 1, it is noted that the body control module M1 can be configured to control, monitor, or otherwise communicate with the operational components O1, O2, . . . On of the recreational vehicle 10 using the user prompts of the user interface 20. A "module," as utilized herein, can be a stand-alone programmable controller or a component of a programmable controller that integrates the functionality of the module with other functionality. In either case, the body control module M1 can be any type of RV controller that can be configured to control, monitor, or otherwise communicate with the various operational components of the RV in which it is installed. The body control module M1 can be configured in a variety of ways including, for example, through the use of user prompts at the user interface 20, or by directly uploading configuration settings to the body control module M1 via a suitable data link 22, which is illustrated in FIG. 1 as part of the user interface 20 and may, for example, be a serial data port. Although the user interface 20 is one convenient place to provide the data link 22 because of its accessibility within the recreational vehicle 10, the present disclosure encompasses configurations where the data link 22 is provided in alternative locations such as at one or both of the modules M1, M2, or as a stand-alone unit that communicates with the user interface 20, or one or both of the modules M1, M2, wirelessly via Bluetooth, Wi-Fi, or otherwise.

It is noted that the user prompts of the user interface 20 need not be the sole or primary mechanism for associating particular operational components, particular weight-related parameters, and other data with the recreational vehicle 10. In particular embodiments, the present disclosure also encompasses the use of user prompts at the user interface 20 to designate data by accessing and uploading particular data via the aforementioned data link 22 to facilitate the aforementioned association of designated data with the recreational vehicle. For example, in one embodiment, a library of vehicle-specific floor plans may be uploaded via the user interface by accessing the library from the user interface via the data link 22, to permit the user to select a floor plan that matches the actual floor plan of the vehicle. In other embodiments, respective libraries of potentially matching operational components O1, O2, . . . On, weight-related parameters W1, W2, . . . Wn, and Gross Vehicle Weight Ratings (GVWR) may also be made available for association with the recreational vehicle 10. In many cases, this type of functionality will be restricted to use by configuring technicians, as opposed to operators of the recreational vehicle.

The user interface 20 may also include user prompts that allow users to select or create particular floor plans. More specifically, the user interface 20 may include user prompts that invite a technician or operator of the RV 10 to enter, select, upload, or otherwise designate particular floor plans, floor plan elements, accessories, and/or operational components with the RV 10 such that the commands and information available at the user interface 20 correspond accurately with the particular RV in which the user interface is installed. The iN-Command® control system offered by ASA Electronics is one example of a readily available RV controller that can be configured to embody the aforementioned functionality and provide the user with real time information concerning an RV and the status of the various operational components of the RV. Additional examples of commercially available RV controller technologies include the Total Coach™ HMS365 system available from SilverLeaf Electronics, Inc., and the Firefly System available from Firefly Integrations, LLC.

In one embodiment, it is contemplated that the user interface may provide an indication of vehicle weight or the remaining cargo weight available, the latter of which would be based on a difference between the GVWR and the calculated vehicle weight.

As is illustrated schematically in FIG. 1, the user interface 20, the body control module M1, the weight-processing module M2, the operational components O1, O2, O3, and the weight-sensing components S1, S2 of the recreational vehicle 10 may communicate with each other via WiFi, MiFi, Bluetooth®, or another wireless technology, via a CAN bus or other hard wired connection network, or via any other conventional or yet-to-be developed technology that allows microcontrollers and devices to communicate with each other in applications with or without a host computer. In one embodiment of the present disclosure, an RV controller is provided that incorporates the functionality of the body control module M1 and the weight processing module M2 in a single processing unit, although embodiments including multiple independent processing units are also considered part of the present disclosure. Because the body control module M1 and the weight processing module M2 are in communication with the operational components O1, O2, O3 and the weight-sensing components S1, S2, respectively, the operation of one these system elements can affect the functionality of another. For example, where the operational component O comprises an electric or hydraulic slide out mechanism for a slide room, the body control module M1 can be used to control the slide out mechanism. Where the operational component O comprises a smoke detector, tank level monitor, or some other type of sensor, the component O can send data to the module M1 for use by the module M1, and/or the module M1 can send commands or other types of control signals to the sensor. Thus, it is contemplated that the aforementioned communication between the modules M1, M2 and the operational components O1, O2, O3 can be either one-way or two-way communications, with the provision that, in many cases, it will not be advantageous to permit vehicle operators to disable operational components that are safety-related.

As is further illustrated in FIG. 1, the user interface 20, the weight processing module M2, the body control module M1, or a combination thereof, can be configured to communicate with a mobile device 30 to facilitate the association of particular operational components O1, O2, . . . On and particular weight-related parameters W1, W2, . . . Wn with the recreational vehicle 10 from the mobile device 30. In this manner, the user interface 20 and the body control and weight processing modules M1, M2 may communicate with a dedicated app resident on a smart phone, tablet, or other mobile device to facilitate the aforementioned monitoring and control from the mobile device 30, which may include, for example, touch screen controls for monitoring or controlling vehicle lighting and appliances, or alarms, such as, smoke detection, propane detection, carbon monoxide detection, and open-door alarms.

Figure 3:
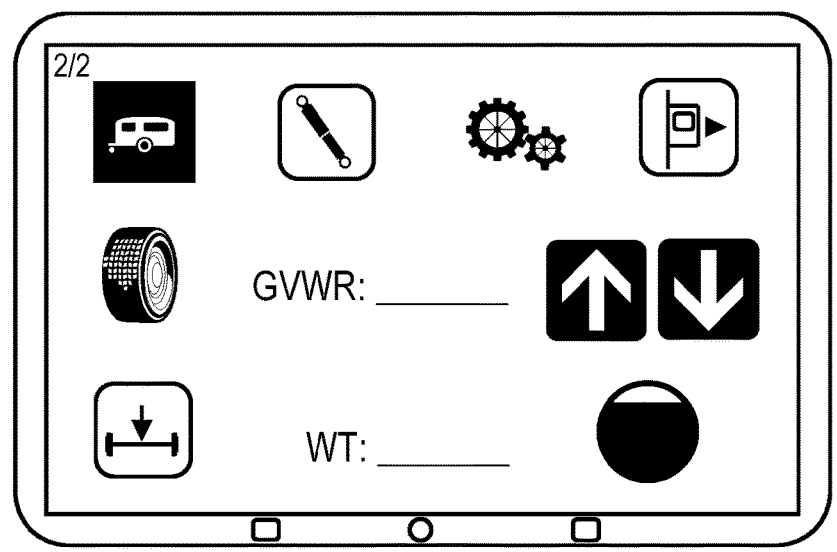
FIG. 3 is a schematic illustration of a user interface page including user prompts for associating a particular weight-related parameter with a recreational vehicle, presented in the non-limiting context of a tablet-type computing device with specific, non-limiting, touch screen icons and graphics.

FIG. 3 is a schematic illustration of a second user interface page including user prompts for associating particular weight-related parameters W1, W2, . . . Wn with a recreational vehicle. As is noted above, the weight-related parameters W1, W2, . . . Wn are factors or variables that affect the manner in which a sensed weight is calculated, reported, or otherwise used to provide an operator of the RV with useful information regarding the weight of the vehicle. For example, and not by way of limitation, weight-related parameters W1, W2, . . . Wn may include configuration metrics associated with the particular type of weight-sensing components S1, S2, . . . Sn in use with the recreational vehicle. More specifically, these configuration metrics may be used to establish the type, number, or operating parameters of the particular weight-sensing components S1, S2, . . . Sn in use so that the weight-sensing module M2 may utilize the signals therefrom to calculate vehicle weight in an accurate and reliable manner. For the purposes of the present disclosure, it is noted that a "calculated" weight value may involve the use of a suitable calculation algorithm, or may be entirely dependent upon the use of a data lookup table.

Figure 4:
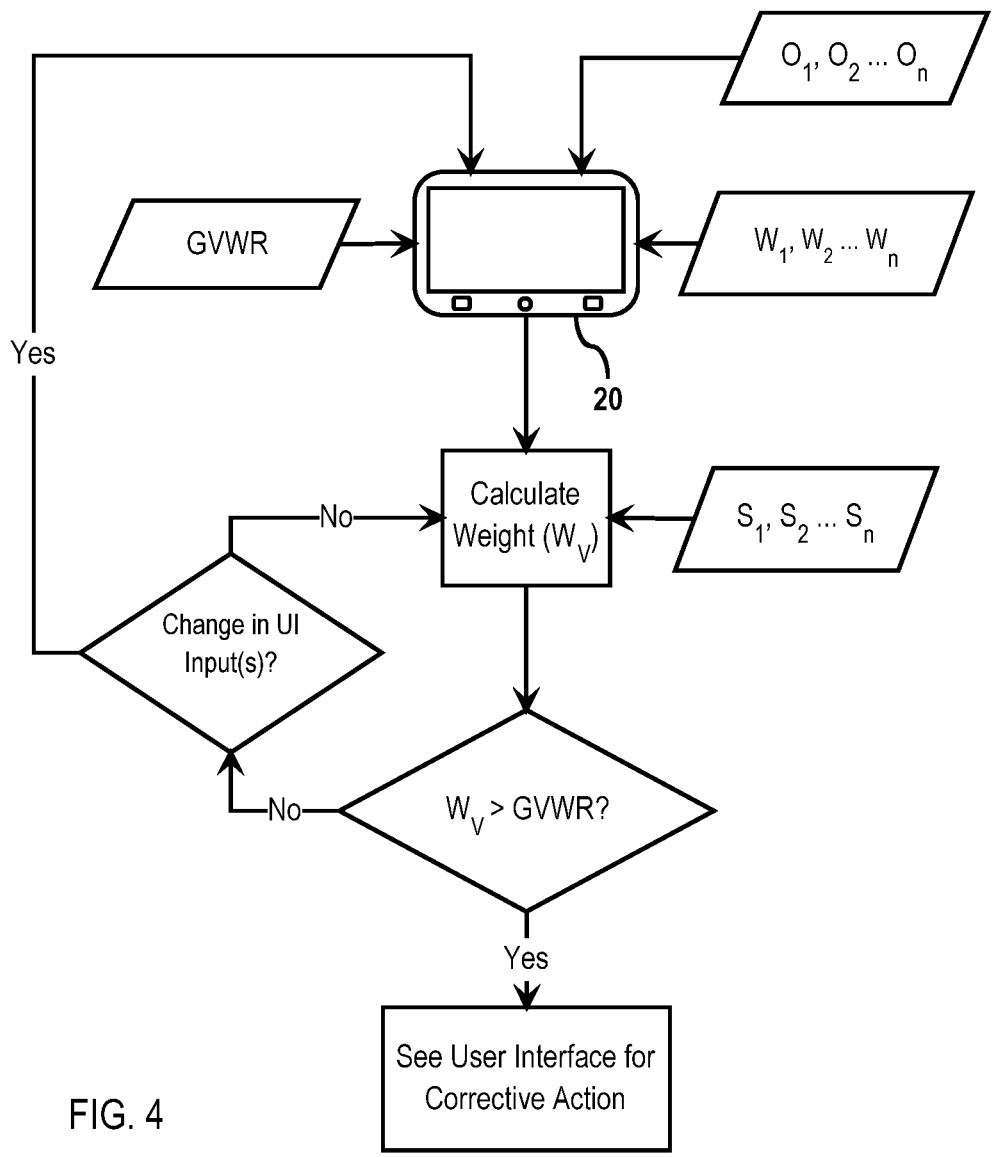
FIGS. 4-6 are flow charts illustrating various ways in which a weight processing module, weight-sensing components, and user interface of a recreational vehicle may be structured to generate an indication of vehicle weight at the user interface of the recreational vehicle.

Referring collectively to FIGS. 1, 3 and 4, in many embodiments, the weight-sensing components S1, S2, . . . Sn will generate raw vehicle weight signals that are used to calculate vehicle weight $W_V$. In this case, the weight processing module M2 is programmed to transform the raw vehicle weight signals into an indication of vehicle weight at the user interface 20. This transformation may be at least partially dependent upon the particular weight-related parameters W1, W2, . . . Wn that are associated with the recreational vehicle 10 at the user interface 20.

In one embodiment, the aforementioned transformation of the raw vehicle weight signal comprises an additive operation that accounts for the "unsprung" weight of the RV, that is, the weight of the suspension, wheels, and other components directly connected to them, rather than the components supported by the suspension. This is particularly useful for sensor configurations that do not account for the weight of the suspension, wheels, and other components directly connected to them. At least one user prompt at the user interface 20 prompts a user to designate data representing the unsprung weight of the RV. This can be accomplished by prompting the user to upload, select, and/or enter particular information at the user interface 20. In this manner, the unsprung weight of the recreational vehicle can be added to the sensed weight of the RV to generate the indication of vehicle weight at the user interface.

In another embodiment, a user prompt at the user interface 20 prompts a user to designate data representing a configuration metric of the weight-sensing components S1, S2, . . . Sn. As is noted above, possible configuration metrics include, but are not limited to, the type, number, or operating parameters of the particular weight-sensing components S1, S2, . . . Sn in use. Regardless of the type or number of configurations metrics used, the raw vehicle weight signal can be converted into the indication of vehicle weight by accounting for the configuration metric. By providing for the designation of the configuration metric at the user interface 20, or elsewhere in the system of the present disclosure, the weight processing module M2 is able to function with a variety of weight-sensing components S1, S2, . . . Sn to generate the indication of vehicle weight at the user interface 20. For example, and not by way of limitation, contemplated weight-sensing components S1, S2, . . . Sn include, but are not limited to load-bearing component strain gauges, displacement gauges, pressure gauges, or combinations thereof. More particularly, and not by way of limitation, the present disclosure encompasses: the use of strain gauges on the axles and/or fifth wheel hitch-mounts of a trailer, as described in US 2007/0181350, U.S. Pat. No. 5,880,409, U.S. Pat. No. 5,811,738, and U.S. Pat. No. 5,327,791; vehicle load measuring systems that measure an amount of a load based on the distortion of an axle, as disclosed in U.S. Pat. No. 6,590,168; weight measurement systems that use load sensors to calculate the stress on a load bearing member coupled between the load and the wheels of a vehicle, as disclosed in U.S. Pat. No. 6,118,083, or load cells, strain gauges, or displacement transducers on the leaf spring, coil spring, or other suspension component of a vehicle; the use of pressure sensors configured to measure force applied to suspension cylinders coupled to the wheels of a vehicle, as disclosed in U.S. Pat. No. 5,391,843; and the adaptation of a vehicle's air suspension to serve as a weight sensor, as disclosed in U.S. Pat. No. 5,780,782 and U.S. Pat. No. 7,572,988.

Referring further to the flow chart of FIG. 4, which illustrates the operational components O1, O2, . . . On and the weight-related parameters W1, W2, . . . Wn as data that may be entered, selected, uploaded, or otherwise designated at the user interface, it is noted that the indication of vehicle weight may be further dependent upon a GVWR that is designated at the user interface 20—typically by a configuring technician who uses prompts at the user interface 20 to enter, select, upload, or otherwise designate the data, as opposed to an operator of the RV. Given this additional designation of data, and a calculation of vehicle weight $W_V$, the weight processing module M2, the weight-sensing components S1, S2, . . . Sn, and the user interface 20 can be structured to indicate whether the vehicle weight $W_V$ has exceeded the predetermined GVWR. If so, a GVWR indicator, or some other prompt for corrective action, can be displayed at the user interface 20. If not, the weight processing module M2, the weight-sensing components S1, S2, . . . Sn, and the user interface 20 can continuously calculate vehicle weight $W_V$ as the signals from the weight-sensing components S1, S2, . . . Sn change.

FIG. 4 also illustrates that the weight processing module M2, the weight-sensing components S1, S2, . . . Sn, and the user interface 20 can be structured to regenerate the calculation and indication of vehicle weight $V_W$ at the user interface 20 in response to changes in data previously designated at the user interface 20. For example, if the vehicle weight calculation relies on a particular configuration metric associated with the weight-sensing components S1, S2, . . . Sn, and that configuration metric is changed by the configuring technician at the user interface 20, the vehicle weight $W_V$ will be calculated based on the new configuration metric.

Figure 5:
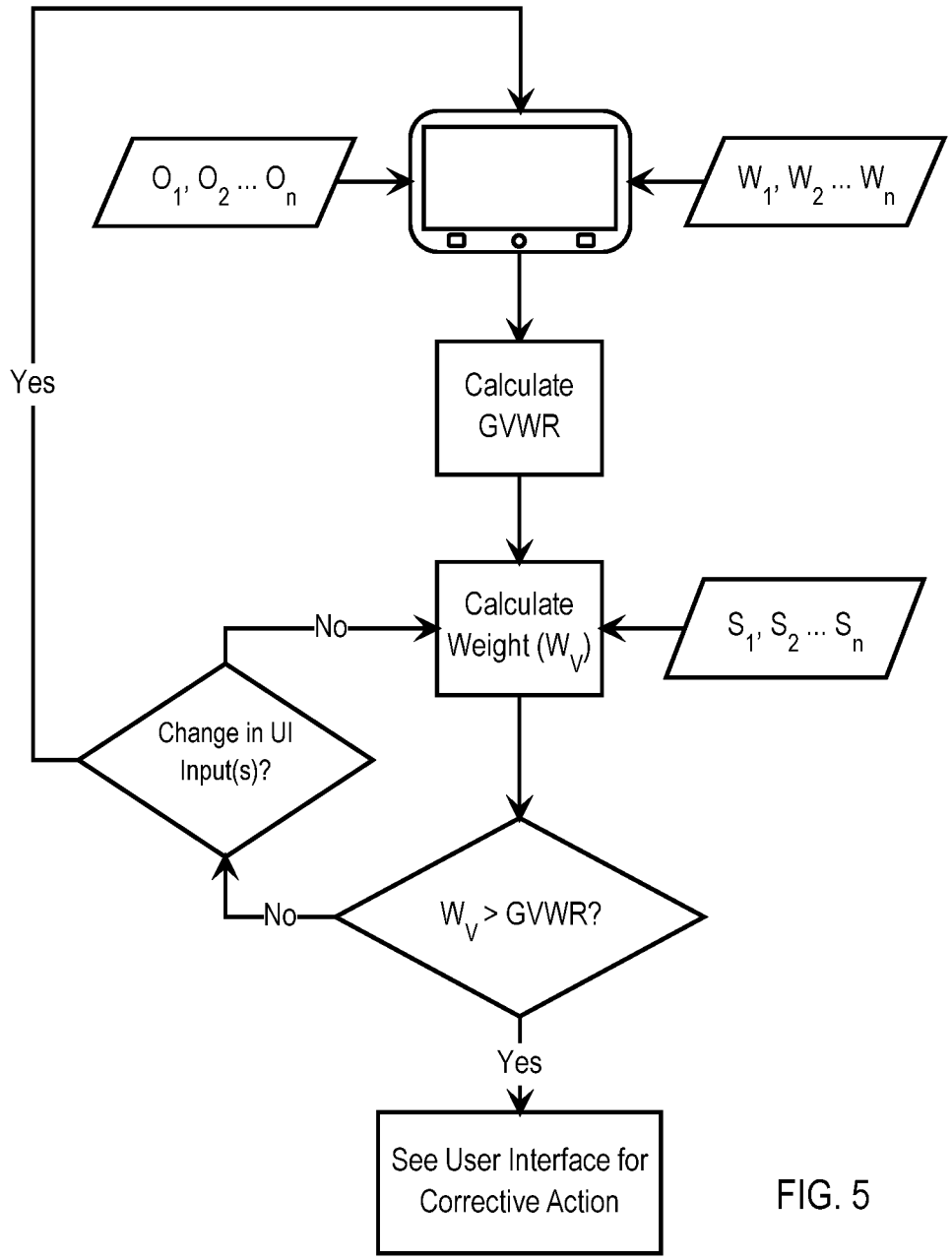

The flow chart of FIG. 5 illustrates an embodiment where the weight processing module M2 is structured to calculate the GVWR associated with a recreational vehicle by referring to the particular operational components O1, O2, . . . On associated with the recreational vehicle at the user interface 20 in addition to the particular weight-related parameters W1, W2, . . . Wn. In this embodiment, access to the user interface 20 would be limited to a configuring technician, as opposed to the operator of the RV, and the indication of vehicle weight may comprise the calculated weight value $W_V$ or a GVWR indicator representing whether the vehicle weight $W_V$ has exceeded the calculated GVWR.

Figure 6:
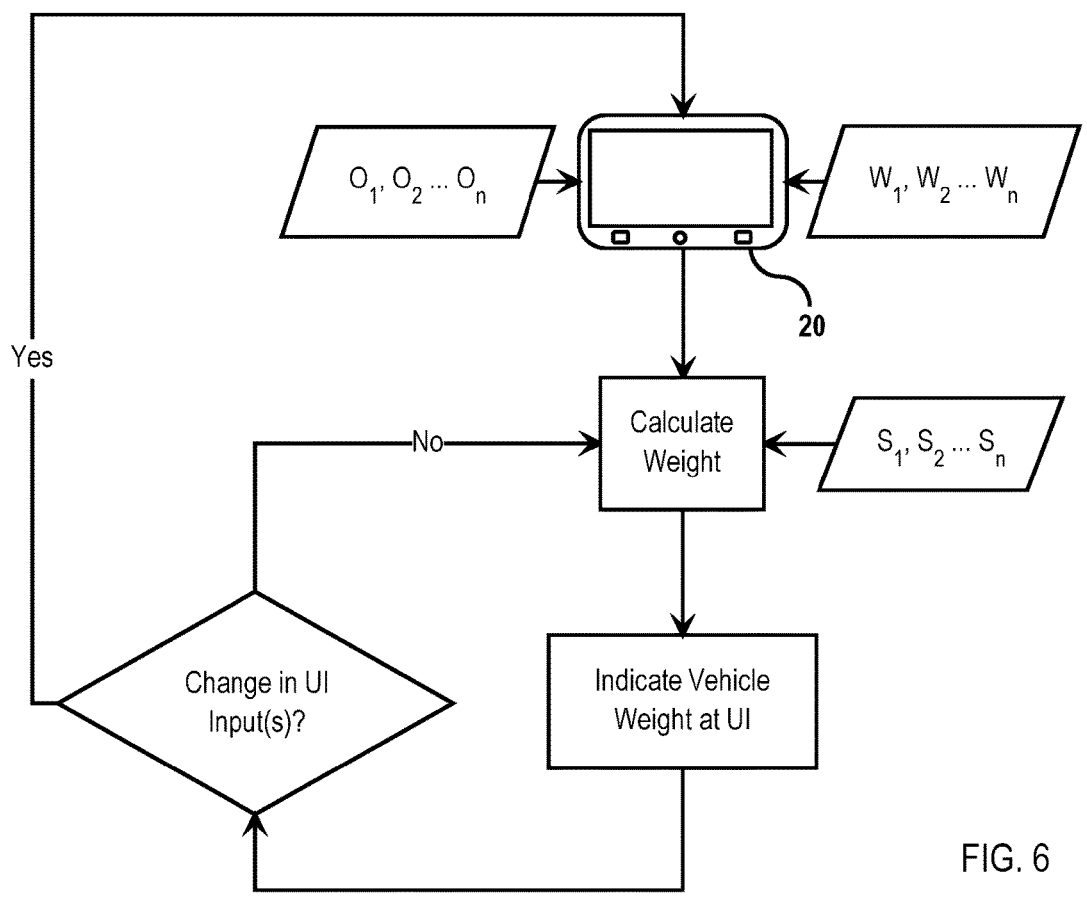

In some embodiments, it may be preferable to give a configuring technician the ability to change one or more of the weight-related parameters W1, W2, . . . Wn associated with the recreational vehicle. For example, turning to the flow chart of FIG. 6 and, more particularly, the "Change in UI Inputs?" decision block of the flow chart, in particular embodiments, the weight processing module M2, the weight-sensing components S1, S2, . . . Sn, and the user interface 20 can be structured to regenerate the indication of vehicle weight at the user interface 20 if there is a change to the weight-related parameters W1, W2, . . . Wn associated with the recreational vehicle. More specifically, if the technician changes the weight-related parameters W1, W2, . . . Wn by using suitable user prompts at the user interface 20, and these changes are significant, the changes can be used to regenerate the indication of vehicle weight at the user interface 20. This "Change in UI Inputs?" decision block can also be used to regenerate the indication of vehicle weight at the user interface 20 if there is a change to a particular operational component O1, O2, . . . On upon which the indication of vehicle weight is dependent.

In other embodiments, it may be preferable to provide a calibration protocol for the aforementioned indication of vehicle weight. More specifically, in some embodiments, the user interface 20 may comprise calibration prompts for calibrating the manner in which the indication of vehicle weight is generated. These calibration prompts may be presented in a variety of forms but should, in any form, provide a clear, user-friendly, protocol for measuring and recording actual vehicle weight. The actual vehicle weight can then be used to generate a calibrated indication of vehicle weight at the user interface. For example, in one embodiment, a user is prompted to start a calibration routine by moving an unloaded vehicle to a scale for determining actual vehicle weight. The actual vehicle weight can then be used by the weight processing module M2 as a calibration input to correct for errors in the manner in which vehicle weight is determined. This correction may, for example, involve the incorporation of an offset value, correction factor, or scaling factor in the weight calculation routine that is employed by the weight processing module M2. Recalibration prompts may be generated automatically at the user interface 20 on a periodic basis, based on a time or mileage metric, for example. Alternatively, or additionally, the user interface 20 may comprise prompts for initiating a calibration protocol manually. Regardless of how or when the calibration protocol is initiated, it can be advantageously designed to correct for errors in the calculation of vehicle weight, which errors may manifest themselves as a gradual drift in a calculated vehicle weight, or as abrupt changes in calculated vehicle weight.

It is noted that recitations herein of "at least one" component, element, etc., should not be used to create an inference that the alternative use of the articles "a" or "an" should be limited to a single component, element, etc.

It is noted that recitations herein of a component of the present disclosure being "configured," "structured," or "programmed" in a particular way, to embody a particular property, or to function in a particular manner, are structural recitations, as opposed to recitations of intended use. More specifically, the references herein to the manner in which a component is "configured," "structured," or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle comprising:
    a vehicle body supported by at least one axle assembly;
    a plurality of operational components;
    at least one weight-sensing component;
    a body control module in communication with the operational components;
    a weight processing module in communication with the weight-sensing component; and
    a user interface, wherein
        the user interface is in communication with the body control module and the weight processing module,
        the user interface comprises associative operational component prompts representing operational components to be associated with the recreational vehicle,
        the user interface comprises a weight-related parameter prompt representing a vehicular weight-related parameter to be associated with the recreational vehicle,
        the weight processing module, the weight-sensing component, and the user interface are structured to generate an indication of vehicle weight at the user interface,
        the vehicular weight-related parameter to be associated with the recreational vehicle at the user interface comprises a factor or variable that affects the manner in which the weight processing module, the weight-sensing component, and the user interface generate the indication of vehicle weight at the user interface, and
        the indication of vehicle weight is at least partially dependent upon the vehicular weight-related parameter associated with the recreational vehicle at the user interface.

2. The recreational vehicle as claimed in claim 1 wherein the user interface comprises user prompts for accessing and uploading data representing the operational components and the vehicular weight-related parameter via an external data link.

3. The recreational vehicle as claimed in claim 2 wherein the external data link is provided at the user interface.

4. The recreational vehicle as claimed in claim 1 wherein the weight processing module, the weight-sensing component, and the user interface are structured to regenerate the indication of vehicle weight at the user interface if there is a change to the weight-related parameter associated with the recreational vehicle, the change to the weight-related parameter originating from use of the user prompts at the user interface.

5. The recreational vehicle as claimed in claim 1 wherein the indication of vehicle weight is further dependent upon one or more of the operational components associated with the recreational vehicle at the user interface.

6. The recreational vehicle as claimed in claim 5 wherein the weight processing module, the weight-sensing component, and the user interface are structured to:
    regenerate the indication of vehicle weight at the user interface if there is a change to the weight-related parameter associated with the recreational vehicle, the change to the weight-related parameter originating from use of the user prompts at the user interface; and
    regenerate the indication of vehicle weight at the user interface if there is a change to a operational component upon which the indication of vehicle weight is dependent, the change to the operational component originating from use of the user prompts at the user interface.

7. The recreational vehicle as claimed in claim 1 wherein:
    the weight-sensing component generates one or more raw vehicle weight signals; and
    the weight processing module transforms the raw vehicle weight signal into the indication of vehicle weight at the user interface in a manner that is at least partially dependent upon the weight-related parameter associated with the recreational vehicle at the user interface.

8. The recreational vehicle as claimed in claim 7 wherein:
    at least one user prompt at the user interface prompts a user to designate data representing the unsprung weight of the recreational vehicle; and
    at least a portion of the transformation of the raw vehicle weight signal comprises an additive operation where the unsprung weight of the recreational vehicle is added to a sensed vehicle weight to provide the indication of vehicle weight at the user interface.

9. The recreational vehicle as claimed in claim 7 wherein:
    at least one user prompt at the user interface prompts a user to designate data representing a configuration metric of the weight-sensing component; and
    at least a portion of the transformation of the raw vehicle weight signal comprises a transformative operation where the raw vehicle weight signal is converted into the indication of vehicle weight by accounting for the configuration metric.

10. The recreational vehicle as claimed in claim 1 wherein:
    the indication of vehicle weight is further dependent upon a predetermined Gross Vehicle Weight Rating (GVWR) designated at the user interface; and
    the indication of vehicle weight comprises a GVWR indicator representing whether the vehicle weight has exceeded the predetermined GVWR.

11. The recreational vehicle as claimed in claim 1 wherein:
    the indication of vehicle weight is further dependent upon a predetermined GVWR designated at the user interface; and the weight processing module, the weight-sensing component, and the user interface are structured to regenerate the indication of vehicle weight at the user interface if there is a change to the predetermined GVWR.

12. The recreational vehicle as claimed in claim 1 wherein:
the weight processing module is structured to calculate a GVWR associated with the recreational vehicle based upon one or more of the operational components associated with the recreational vehicle at the user interface; and
the indication of vehicle weight comprises a calculated weight value associated with the recreational vehicle or a GVWR indicator representing whether the vehicle weight has exceeded the predetermined GVWR.

13. The recreational vehicle as claimed in claim 1 wherein the weight processing module and the user interface operate to generate the indication of vehicle weight by accounting for automated adjustments to the predetermined GVWR by the weight processing module as a function of data designated at the user interface.

14. The recreational vehicle as claimed in claim 1 wherein the weight processing module and the user interface operate to generate the indication of vehicle weight by accounting for manual adjustments to the predetermined GVWR at the user interface.

15. The recreational vehicle as claimed in claim 1 wherein the weight-related parameter upon which the indication of vehicle weight is dependent is selected from a configuration metric of the weight-sensing component of the recreational vehicle.

16. The recreational vehicle as claimed in claim 15 wherein the configuration metric of the weight-sensing component represents a type or count variable associated with the weight-sensing component.

17. The recreational vehicle as claimed in claim 1 wherein the weight-related parameter upon which the indication of vehicle weight is dependent comprises a GVWR associated with the recreational vehicle.

18. The recreational vehicle as claimed in claim 1 wherein the weight-related parameter upon which the indication of vehicle weight is dependent comprises a hitch assembly descriptor, a suspension component descriptor, a body component descriptor, or a combination thereof.

19. The recreational vehicle as claimed in claim 1 wherein the weight-related parameter upon which the indication of vehicle weight is dependent comprises a type variable or count variable associated with the axle, tires, or wheels of the recreational vehicle, or a combination thereof.

20. The recreational vehicle as claimed in claim 1 wherein the body control module is configured for controlling or monitoring the operational components of the recreational vehicle using the user prompts of the user interface.

21. The recreational vehicle as claimed in claim 1 wherein the operational components represented by the user prompts of the user interface comprise motorized components selected from electric or hydraulic slide rooms, awnings, stabilizer jacks, hydraulic landing gear, electric hitches, and combinations thereof.

22. The recreational vehicle as claimed in claim 1 wherein the operational components represented by the user prompts of the user interface comprise safety-related components selected from travel lockouts, door alarms, smoke detectors, propane detectors, carbon monoxide detectors, and combinations thereof.

23. The recreational vehicle as claimed in claim 1 wherein the operational components represented by the user prompts of the user interface comprise lighting system components, HVAC components, appliances, generators, latch controls, tank heaters, locks, and battery monitors, tank level monitors, and combinations thereof.

24. The recreational vehicle as claimed in claim 1 wherein the user interface, the weight processing module, the body control module, or a combination thereof, is configured to communicate with a mobile device to facilitate the association of the operational components and the vehicular weight-related parameter with the recreational vehicle from the mobile device.

25. The recreational vehicle as claimed in claim 1 wherein:
the user interface comprises calibration prompts for calibrating the manner in which the indication of vehicle weight is generated at the user interface;
the calibration prompts comprise prompts for measuring and recording actual vehicle weight; and
the weight processing module, the weight-sensing component, and the user interface are structured to generate a calibrated indication of vehicle weight at the user interface after calibration.

26. An integrated body control and weight-sensing system comprising:
at least one weight-sensing component configured to provide a signal representing the weight of the recreational vehicle;
a body control module configured to communicate with operational components of a recreational vehicle;
a weight processing module in communication with the weight-sensing component; and
a user interface, wherein
the user interface is in communication with the body control module and the weight processing module,
the user interface comprises associative operational component prompts representing operational components to be associated with the recreational vehicle,
the user interface comprises a weight-related parameter prompt representing a vehicular weight-related parameter to be associated with the recreational vehicle,
the weight processing module, the weight-sensing component, and the user interface are structured to generate an indication of vehicle weight at the user interface,
the vehicular weight-related parameter to be associated with the recreational vehicle at the user interface comprises a factor or variable that affects the manner in which the weight processing module, the weight-sensing component, and the user interface generate the indication of vehicle weight at the user interface, and
the indication of vehicle weight is at least partially dependent upon the vehicular weight-related parameter associated with the recreational vehicle at the user interface.

27. The system as claimed in claim 26 wherein:
the system further comprises a mobile device that is configured to facilitate the association of the operational components and the weight-related parameter with the recreational vehicle from the mobile device; and the user interface, the weight processing module, the body control module, or a combination thereof, is configured to communicate with the mobile device.

28. A recreational vehicle comprising:
a vehicle body supported by at least one axle assembly;
a plurality of operational components;
at least one weight-sensing component;
a body control module in communication with the operational components;
a weight processing module in communication with the weight-sensing component; and
a user interface, wherein
   the user interface is in communication with the body control module and the weight processing module,
   the user interface comprises associative operational component prompts representing operational components to be associated with the recreational vehicle,
   the user interface comprises a weight-related parameter prompt representing a vehicular weight-related parameter to be associated with the recreational vehicle,
   the weight processing module, the weight-sensing component, and the user interface are structured to generate an indication of vehicle weight at the user interface,
   the vehicular weight-related parameter to be associated with the recreational vehicle at the user interface comprises a factor or variable that affects the manner in which the weight processing module, the weight-sensing component, and the user interface generate the indication of vehicle weight at the user interface, and
   the indication of vehicle weight is at least partially dependent upon the vehicular weight-related parameter associated with the recreational vehicle at the user interface.

29. The recreational vehicle as claimed in claim 28 wherein:
   the weight-sensing component generates one or more raw vehicle weight signals;
   the weight processing module transforms the raw vehicle weight signal into the indication of vehicle weight at the user interface in a manner that is at least partially dependent upon the weight-related parameter associated with the recreational vehicle at the user interface;
   at least one user prompt at the user interface prompts a user to designate data representing the unsprung weight of the recreational vehicle; and
   at least a portion of the transformation of the raw vehicle weight signal comprises an additive operation where the unsprung weight of the recreational vehicle is added to a sensed vehicle weight to provide the indication of vehicle weight at the user interface.

30. The recreational vehicle as claimed in claim 1 wherein:
   the weight-sensing component generates one or more raw vehicle weight signals;
   the weight processing module transforms the raw vehicle weight signal into the indication of vehicle weight at the user interface in a manner that is at least partially dependent upon the vehicular weight-related parameter associated with the recreational vehicle at the user interface;
   at least one user prompt at the user interface prompts a user to designate data representing a configuration metric of the weight-sensing component; and
   at least a portion of the transformation of the raw vehicle weight signal comprises a transformative operation where the raw vehicle weight signal is converted into the indication of vehicle weight by accounting for the configuration metric.

\* \* \* \* \*